(12) United States Patent
Rawat et al.

(10) Patent No.: US 10,708,137 B2
(45) Date of Patent: Jul. 7, 2020

(54) ACTIVE DIRECTORY TOPOLOGY CREATION

(71) Applicant: ENT. SERVICES DEVELOPMENT CORPORATION LP, Houston, TX (US)

(72) Inventors: Madhulika Rawat, Bangalore (IN); Jaswinder Singh, Bangalore (IN)

(73) Assignee: ENT. SERVICES DEVELOPMENT CORPORATION LP, Houston, TX (US)

(*) Notice: Subject to any disclaimer, the term of this patent is extended or adjusted under 35 U.S.C. 154(b) by 268 days.

(21) Appl. No.: 15/306,310

(22) PCT Filed: Aug. 7, 2014

(86) PCT No.: PCT/IN2014/000516
§ 371 (c)(1),
(2) Date: Oct. 24, 2016

(87) PCT Pub. No.: WO2016/020928
PCT Pub. Date: Feb. 11, 2016

(65) Prior Publication Data
US 2017/0149618 A1    May 25, 2017

(51) Int. Cl.
*H04L 12/24* (2006.01)
*H04L 29/08* (2006.01)
(52) U.S. Cl.
CPC .......... *H04L 41/12* (2013.01); *H04L 67/1095* (2013.01)

(58) Field of Classification Search
CPC ........................ H04L 67/1095; H04L 41/12
See application file for complete search history.

(56) References Cited

U.S. PATENT DOCUMENTS

| 7,181,436 B1 | 2/2007 | Conley et al. |
| 8,045,486 B2 | 10/2011 | Swan |

FOREIGN PATENT DOCUMENTS

| CN | 101060433 | 10/2007 |
| CN | 101588354 | 11/2009 |
| WO | WO-2011002777 | 1/2011 |
| WO | WO-2011152996 | 12/2011 |

OTHER PUBLICATIONS

Jerry Martin (Add Subnets, Dec. 29, 2010, https://gallery.technet.microsoft.com/scriptcenter/b4d1d9db-934a-4ad4-9a9b-a315103a1a79, retrieved Feb. 12, 2019) (Year: 2010).*

(Continued)

*Primary Examiner* — Abdulkader M Alriyashi
(74) *Attorney, Agent, or Firm* — Sheppard Mullin Richter & Hampton LLP

(57) ABSTRACT

An example system for creating an active directory topology may determine whether an active directory site corresponding to a site name stored in a data input list exists and create, in response to a determination that the active directory site does not exist, the active directory site. The system may also determine whether a subnet corresponding to a subnet name stored in the data input list exists and create, in response to a determination that the subnet does not exist, the subnet.

13 Claims, 7 Drawing Sheets

(56) References Cited

OTHER PUBLICATIONS

Jerry Martin (Add Sites, Dec. 29, 2010, https://gallery.technet.microsoft.com/scriptcenter/b6818725-716f-46c6-ab64-cde5ab6dcfab, retrieved Feb. 12, 2019) (Year: 2010).*

Jerry Martin (Add Site Links, Dec. 29, 2010, https://gallery.technet.microsoft.com/scriptcenter/e0128121-efc7-436d-91cc-025c0a4a6340, retrieved Feb. 12, 2019) (Year: 2010).*

"Automatically Creating Lync Sites and Subnets Using AD Sites"; http://ucken.blogspot.in/2013/04/automatically-creating-lync-sites-and.html; Apr. 1, 2013; 3 pages.

Auby, T.; "A Creative (and Easy) Way to Assign IP Subnets to AD Sites"; Sep. 10, 2006; 4 pages http://windowsitpro.com/networking/creative-and-easy-way-assign-ip-subnets-ad-sites.

PCT; "Notification of Transmitial of the International Search Report and the Written Opinion of the International Searching Authority, or the Declaration"; cited in PCT/IN2014/000516; dated May 11, 2015; 12 pages.

Shudnow, E., "New-CSSingleRegionNetwork.ps1—Automate Lync Network Site and Subnet Creation"; Sep. 15, 2012; 4 pages http://www.shudnow.net/2012/09/15/new-cssingleregionnetwork-ps1-automate-lync-network-site-and-subnet-creation/.

Zerger, P.; "Script: Automating Bulk Creation of the Physical and Logical Active Directory Structure (Sites)"; Jul. 6, 2011; 4 pages http://www.systemcentercentral.com/script-automating-bulk-creation-of-the-physical-and-logical-active-directory-structure-sites/.

* cited by examiner

ACTIVE DIRECTORY TOPOLOGY CREATION

CLAIM FOR PRIORITY

The present application is a national stage filing under 35 U.S.C. § 371 of PCT application number PCT/IN2014/000516, having an international filing date of Aug. 7, 2014, the disclosure of which is hereby incorporated by reference in its entirety.

BACKGROUND

An active directory is a directory service for networks which stores information about the components of the network. More particularly, an active directory is an arrangement of information about objects such as resources (e.g., printers) and security principals (e.g., users). The physical structure of an active directory, or topology, may include a number of sites that are physical groupings defined by at least one subnet. The sites control network traffic generated by replication. Specifically, site links use the defined sites to manage traffic within the network. An active directory synchronizes changes within the network through replication which pulls changes within the network from a server at certain replication intervals.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

An active directory is a directory service for networks which stores information about the components of the network. One such directory service is Microsoft's Active Directory®. The active directory topology reflects the physical network topology of the networking environment. In order to create the topology, a data input list, such as a spreadsheet, may be created that lists how the network topology should be created. For example, the data input list may include information such as site names corresponding to specific active directory sites in the active directory and associated subnets that are associated with the active directory sites. Based on the data input list, the active directory sites corresponding to the site names in the data input list and subnets may be manually inputted into the active directory. Additionally, the site links and other attributes such as site link cost and replication interval may also be manually entered into the active directory. Manually entering this information into the active directory may take time and valuable resources. Thus, it is desirable to create automatic systems and methods for creating an active directory topology. Accordingly, various examples herein describe automatic systems and methods for creating and updating an active directory topology.

Figure 1:
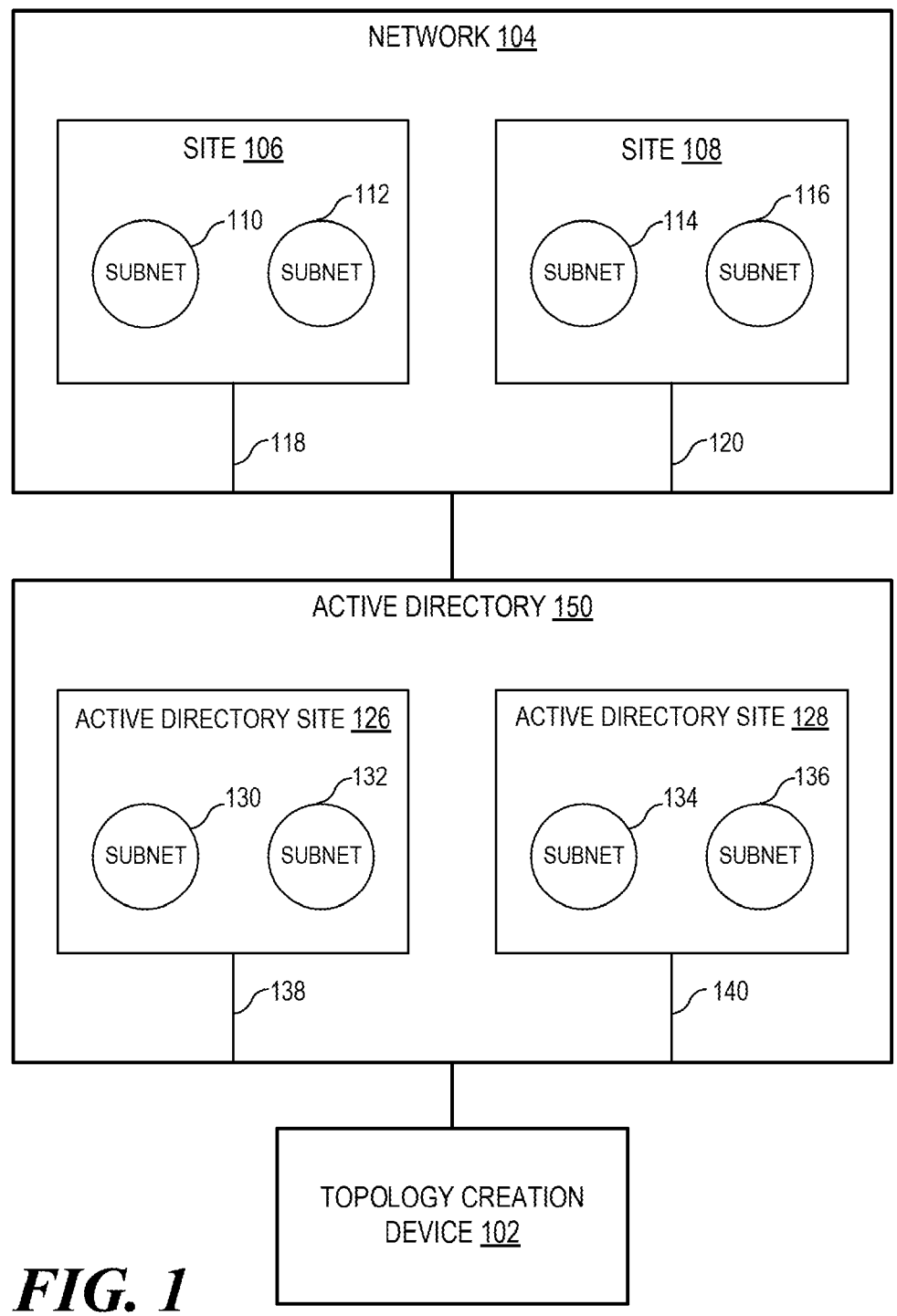
FIG. 1 shows a block diagram of an active directory topology creation system, according to an example.

FIG. 1 is a block diagram of an active directory topology creation system 100, according to an example. The system 100 may include topology creation device 102, network 104, and active directory 150. In certain examples, topology creation device 102 is a computing device, such as a server, client computer, desktop computer, mobile computer, workstation, etc. In other examples, topology creation device 102 may include a special purpose machine. Topology creation device 102 may be implemented via a processing element, memory, and/or other components. Topology creation device 102 may create and/or update the physical structure, otherwise known as topology, of network 104.

Network 104 is a telecommunication network that allows computers to exchange data. Network 104 may use wired communications, wireless communications, or combinations thereof. Further, network 104 may include multiple sub networks ("subnets") such as data networks, wireless networks, telephony networks, etc. In an example, network 104 may comprise subnets 110-116. Subnets 110-116 are subdivisions of network 104.

Although four subnets, subnets 110-116, are depicted in FIG. 1, network 104 may comprise any number of subnets. Subnets 110-116 may include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Various communications structures and infrastructure may be utilized to implement network 104.

By way of example, devices within network 104 may communicate with each other via a communication protocol or multiple protocols. A protocol can be a set of rules that defines how nodes of network 104 interact with other nodes. Further, communications between network nodes can be implemented by exchanging discrete packets of data or sending messages. Packets may include header information associated with a protocol (e.g., information on the location of the network node(s) to contact) as well as payload information.

Sites 106-108 represent the topology of network 104. Site 106 is a set of well-connected subnets 110-112. Site 108 is a set of well-connected subnets 114-116. Thus, it may be said that subnets 110-112 are associated with site 106 while subnets 114-116 are associated with site 108. While site 106 is represented as having two subnets in FIG. 1, subnets 110-112, site 106 may be comprised of any number of subnets. Similarly, site 108 may be comprised of any number of subnets. Thus, sites 106-108 may be a set of well-connected computers. Site links 118-120 may be network connections that are used to connect sites 106-108 with each other or with additional sites in network 104.

The system 100 may synchronize changes within network 104 through replication. Replication is the process of creating replica of network 104's attributes within sites 106-108. These replicas pull changes from within each site 106-108 at the time the changes are made. However, replicas pull changes from other sites at defined intervals, known as the replication interval. For example, a replica stored in site 106 may pull changes from site 108 every three hours. The replication interval may be set by a user or may be a default value, which in some examples is three hours.

Active directory 150 is a directory service for network 104 which stores information about the components of network 104 and can be utilized to arrange the topology, or physical structure, of network 104. For example, active directory 150 may be utilized to assign subnets 110-112 to site 106 as well as site link 118 to site 106. Similarly, active directory 150 may be utilized to assign subnets 114-116 to site 108 and site link 120 to site 108.

Active directory 150 comprises active directory sites 126-128 and site links 138-140. Active directory site 126 comprises subnets 130-132 while active directory site 128 comprises subnet 134-136. Active directory site 126 may correspond with site 106 in network 104 while active directory site 128 may correspond with site 108. In other words, active directory site 126 is the directory site that may represent the actual network 104 site 106. Similarly, active directory site 128 is the directory site that may represent the actual network 104 site 106. By creating or updating active directory sites 126-128, sites 106-108 in network 104 may be created or updated.

In a similar way, subnets 130-132 in active directory site 126 may correspond with subnets 110-112 in site 106 while subnets 134-136 in active directory site 128 may correspond with subnets 114-116 in site 108. Any changes made to subnets 130-136, through creating, updating or assigning to specific active directory sites, in active directory 150 may effectuate similar changes to subnets 110-116 in network 104. Similarly, site links 138-140 in active directory 150 may correspond with site links 118-120 in network 104. Any changes, through creating, updating, or assigning to specific sites in network 104, made to site links 138-140 may effectuate similar changes to site links 118-120 in network 104.

Active directory 150 may also contain a site link cost for site links 138 and 140, and a replication interval for active directory sites 126 and 128. Active directory 150 may be implemented via a processing element, memory, and/or other components.

Figure 2:
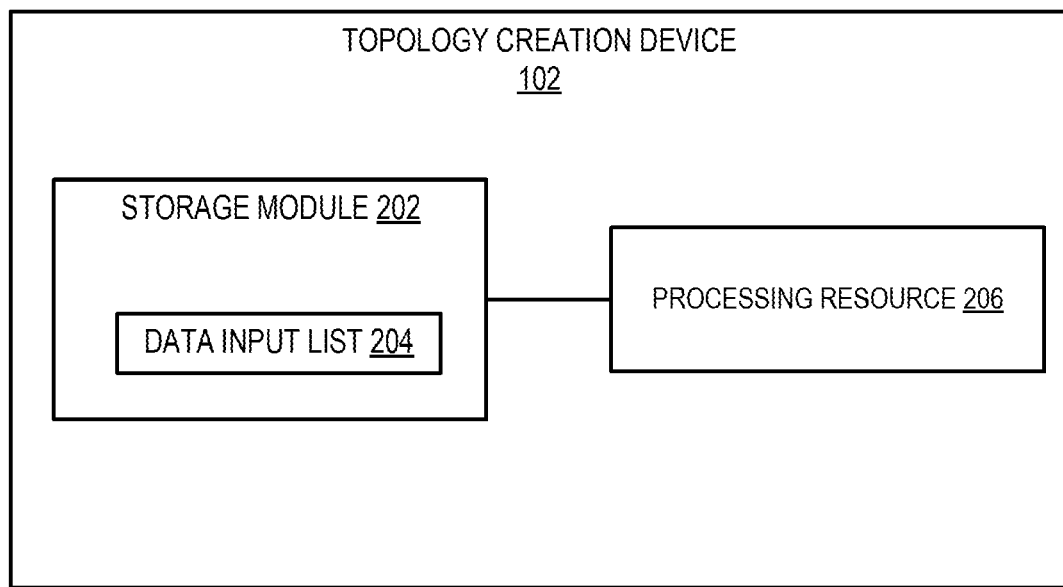
FIG. 2 shows a block diagram of an topology creation device, according to an example.
Figure 2:
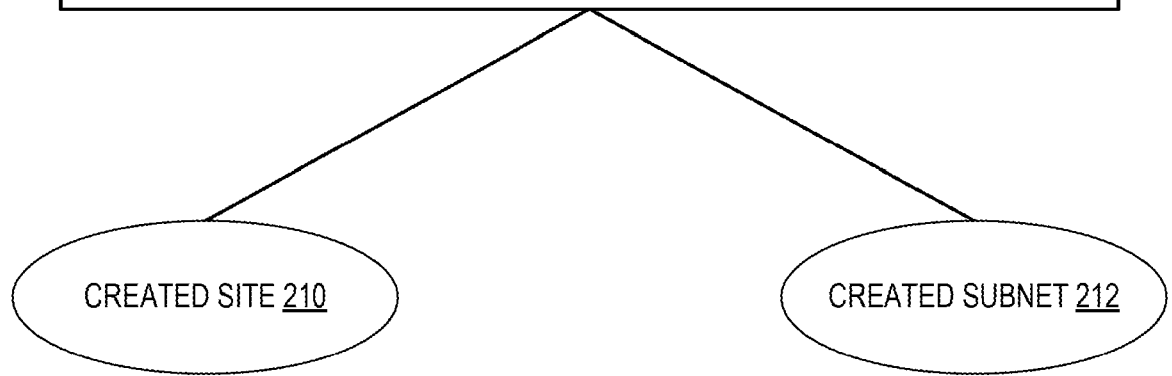

FIG. 2 shows a block diagram of topology creation device 102, according to an example. Topology creation device 102 may comprise a storage module 202 and processing resource 206 and output created site 210 and created subnet 212 as well as other outputs. Storage module 202 may store a data input list 204. Storage module 202 may be any electronic, magnetic, optical, or other physical storage such as Random Access Memory (RAM), an Electrically Erasable Programmable Read-Only Memory (EEPROM), a storage drive, a Compact Disc Read Only Memory (CD-ROM), and the like. While data input list 204 is depicted as being stored in storage module 204, it may also be stored on a disc or in a database.

Data input list 204 is a list of attributes for network 104 that is managed through active directory 150. In other words, data input list 204 may contain information about network 104 or information about how a user desires network 104 to be configured. Data input list 204 may include site names which correspond to active directory sites 126-128, the description and location of active directory sites 126-128 in active directory 150, subnet names which correspond to subnets 130-136, site link names corresponding to site links 138-140, the description of site links 138-140 in active directory 150, replication intervals for active directory sites 126-128, and site link cost corresponding to each of site links 128-140. Site link cost is a value assigned to site links 128-140 that indicate the relative expense of utilizing the specific site link. In an example, site link 128 may have a site link cost based on total bandwidth, availability, latency, and/or monetary cost of using site link 118 in network 104. Similarly, site link 120 may have a site link cost based on total bandwidth, availability, latency, and/or monetary cost of using site link 120.

In an example, data input list 204 is in the format of a spreadsheet, such as a Microsoft Excel® file. Thus, each row of data input list 204, in the form of a spreadsheet, may contain a site name corresponding to a specific active directory site, such as site 126 or 128, a subnet name corresponding to the specific active directory site's associated subnets, such as subnets 130-132 for active directory site 126 or 134-136 for site 128, a site link name corresponding to the specific site's associated site links in active directory 150, such as site link 138 for active directory site 126 and site link 140 for active directory site 128, the replication interval of active directory site 126 or 128, and the site link cost for site links 138-140.

Processing resource 206 may include a central processing unit (CPU), a semiconductor-based microprocessor, a graphics processing unit (GPU), other hardware devices suitable for retrieval and execution of instructions that may be stored on storage module 202. Additionally, processing resource 206 may include a single processor, multiple processors, a single computer, a network of computers, or any other type of processing device. For example, the processing resource 206 may include multiple cores on a chip, multiple cores across multiple chips, multiple cores across multiple devices, or combinations thereof. Processing resource 206 may include at least one integrated circuit (IC), other control logic, other electronic circuits, or combinations thereof that include a number of electronic components. While a single processing resource 206 is depicted in FIG. 2, any number of processing resources may be utilized by topology creation device 102.

Processing resource 206 may access data input list 204 to determine the attributes that are required in network 104. Processing resource 206 may determine whether data input list 204 includes a site name that corresponds with an active directory site, such as active directory site 126 or 128. The following example will focus on active directory site 126; however, a similar procedure may be utilized by topology creation device 102 for active directory site 128. In response to a determination that a site name does exist in data input list 204, processing resource 206 may determine whether active directory site 126 actually exists in active directory 150. In response to a determination that site 126 does not exist in active directory 150, processing resource 206 creates active directory site 126 in active directory 150, shown as output 210, and updates active directory site 126's description and location in data input list 204.

In response to a determination that active directory site 126 does exist in active directory 150 or after updating the site location and description of site 106 in active directory 150, processing resource 206 may determine the subnet name associated with the active directory site name for active directory site 126 in data input list 204. Processing resource 206 may also determine whether subnet 130 or 132 exist within active directory site 126. If either or both subnets 130 or 132 do not exist within active directory site 126, processing resource 206 creates subnet 130 and/or 132, shown as created subnet 212, and associates the created subnet 130 and/or 132, shown as created subnet 212, with active directory site 126. Processing resource 206 then may proceed to the next active directory site, such as active directory site 128 and its corresponding attributes listed in data input list 204, which in some cases, may be found on the next row of a spreadsheet.

Processing resource 206 may also determine whether a site link name corresponding at least one site link 138 or 140 exists in data input list 204. The following example will focus on site link 138; however, a similar procedure may be utilized by topology creation device 102 for site link 140.

In response to a determination that a site link name corresponding to site link 138 does exist in data input list 204, processing resource 206 may determine whether site link 138 actually exists in active directory 150. In response to a determination that site link 138 does not exist in active directory 150, processing resource 206 creates site link 138 in active directory 150 and updates the site link description for site link 118 in data input list 204.

Processing resource 206 may also determine whether a site link cost exits within data input list 204. In response to a determination that a site link cost does not exist within data input list 204, the site link cost in active directory 150 may be updated by processing resource 206 to the default site link cost. In an example, the default site link cost is 100. In response to a determination that a site link cost does exist within data input list 204, processing resource 206 updates the site cost link in active directory 150 to the site cost link found in data input list 204.

Processing resource 206 may also determine whether a replication interval exists in data input list 204. In response to a determination that a replication interval does not exist within data input list 204, processing resource 206 updates active directory 150 to include the default replication interval as the replication interval for site 106. In response to a determination that a replication interval does exist in data input list 204, the replication interval for active directory site 126 is updated in active directory 150 to the replication interval found in data input list 204.

Processing resource 206 also may determine from data input list 204 the site name associated with site link 138, in this example, the site name corresponding to active directory site 126. Processing resource 206 then may determine whether active directory site 126 is associated with site link 138 in active directory 150. In response to a determination that active directory site 126 is not associated with site link 138 in active directory 150, processing resource 206 may associate active directory site 126 with site link 138 in active directory 150. Processing resource 206 then may proceed to the next site link, such as site link 140 and its corresponding attributes listed in data input list 204 which in some cases may be found on the next row of a spreadsheet. In these ways, the topology of network 104 may be created and/or updated in active directory 150 utilizing topology creation device 102.

Figure 3:
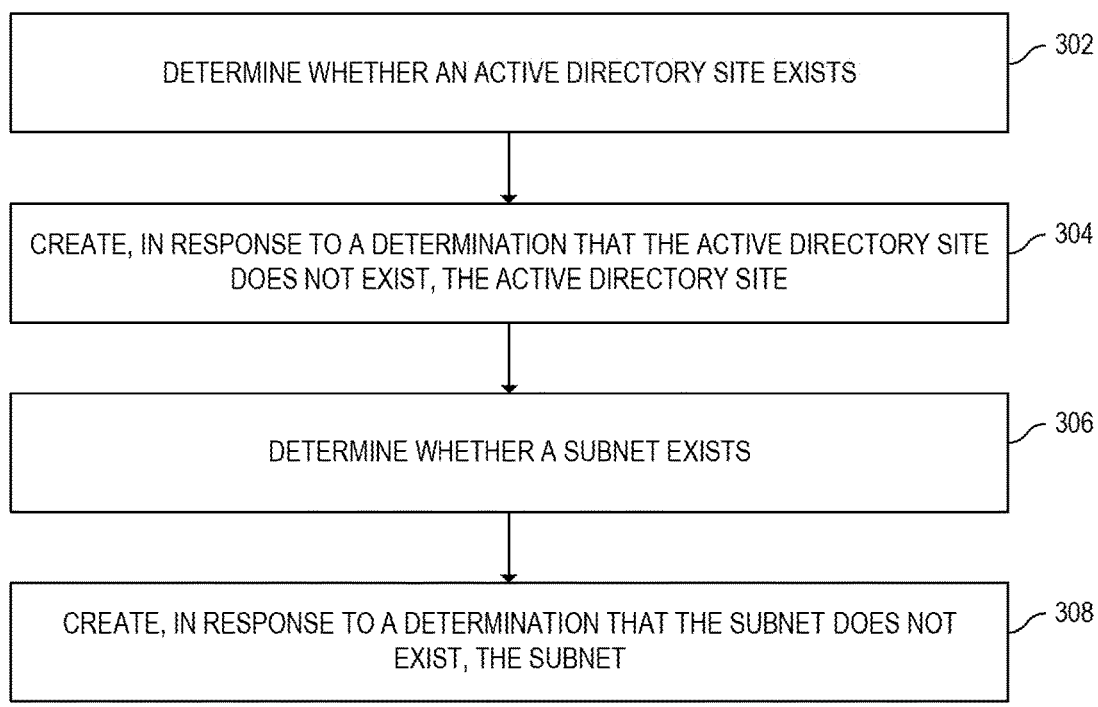
FIG. 3 shows a flowchart of a method for creating an active directory topology, according to an example.
Figure 4:
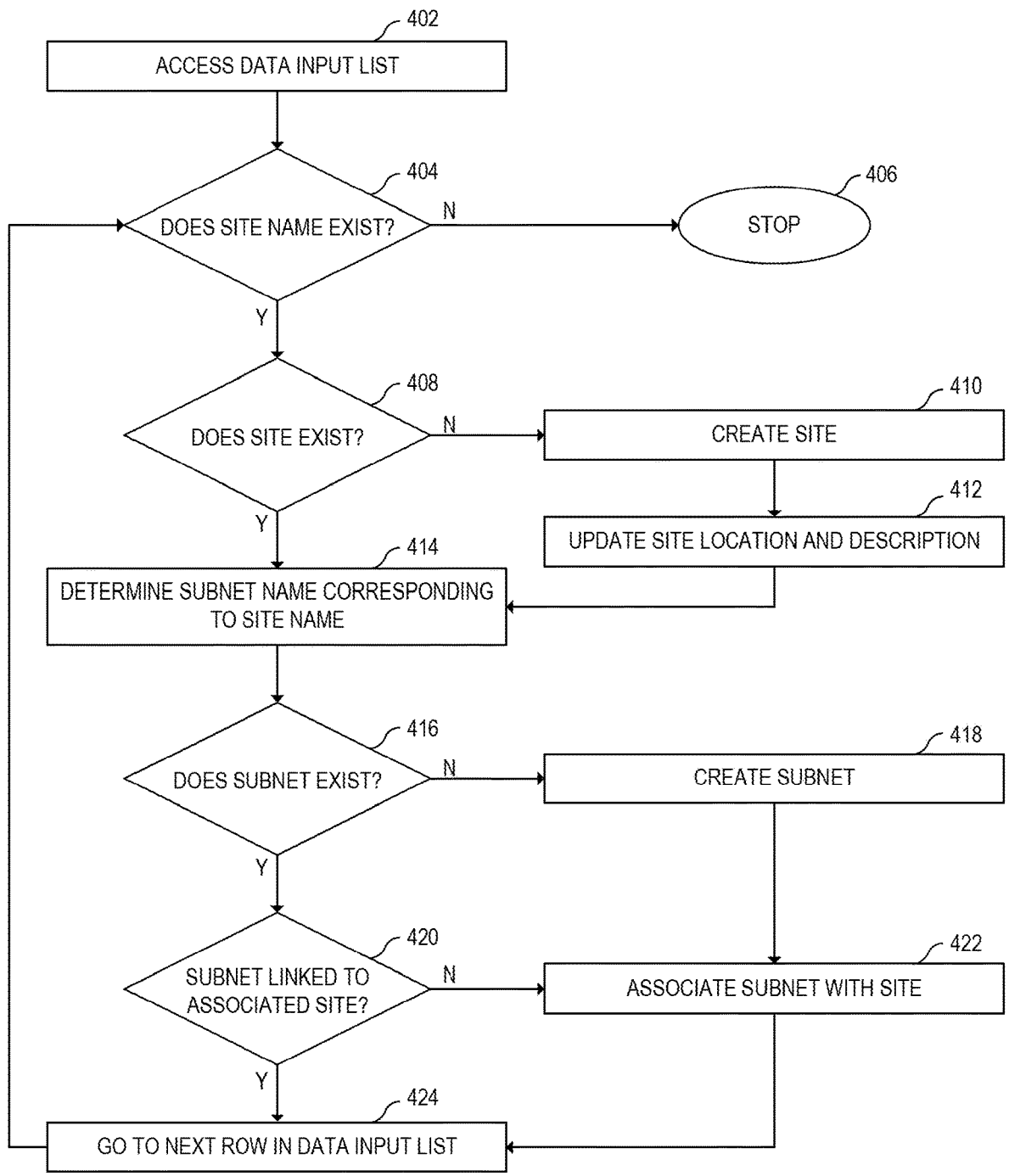
FIG. 4 shows a flowchart of a method for creating an active directory topology, according to an example.
Figure 5:
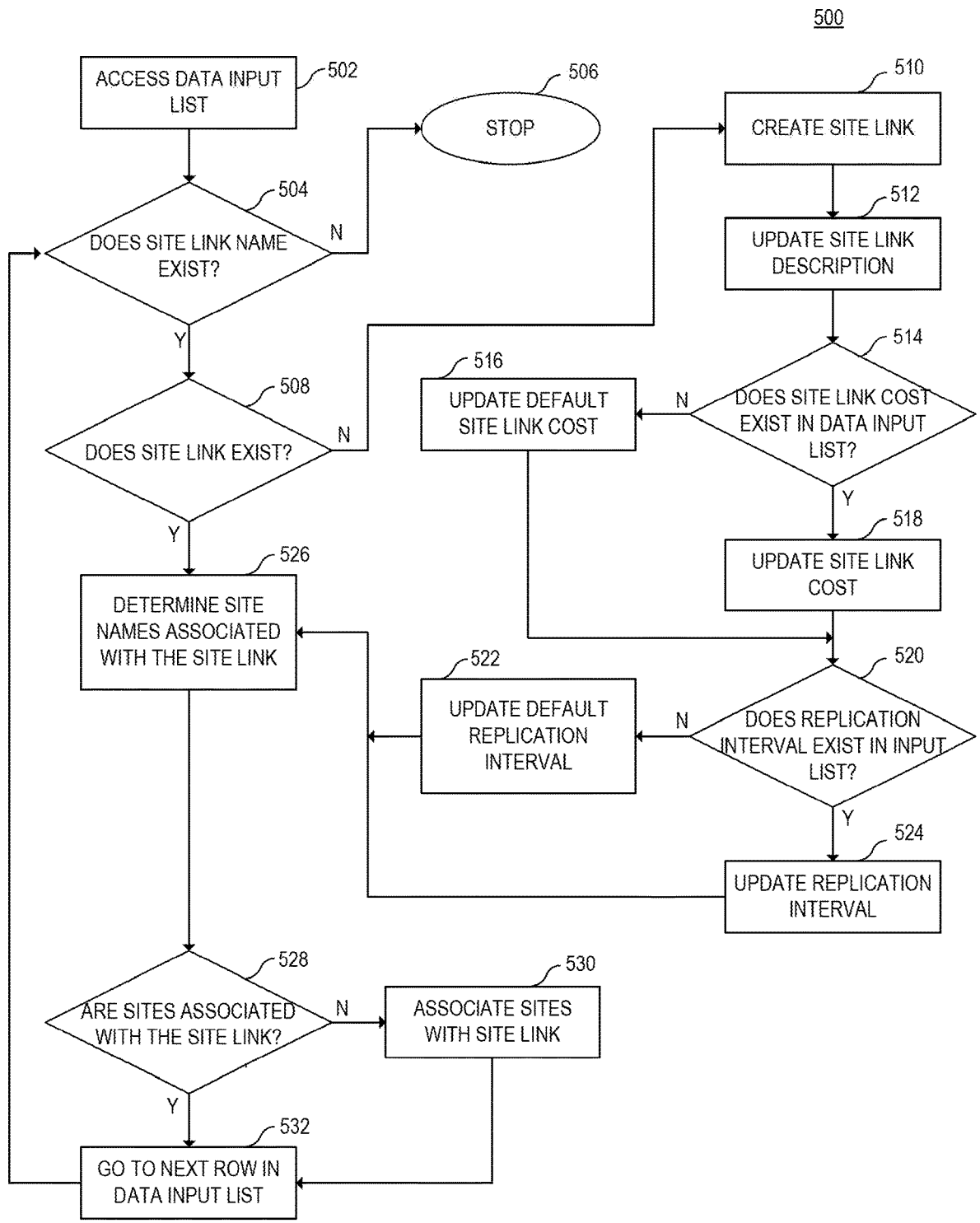
FIG. 5 shows a flowchart of a method for creating an active directory topology, according to an example.

FIGS. 3, 4, and 5 are flowcharts of active directory topology creation methods 300, 400, and 500. Although the execution of methods 300, 400, and 500 is described below with reference to system 100 and topology creation device 102, other suitable components for execution of methods 300, 400, and 500 can be utilized (e.g., computing device 600). Additionally, the components for executing the methods 300, 400, and 500 may be spread among multiple devices. Methods 300, 400, and 500 may be performed by the hardware described herein (e.g., by processing resource 206 and 630 (FIGS. 6 and 7)).

Method 300 begins at 302 with determining whether an active directory site, such as one of active directory sites 126 or 128, corresponding to an active directory site name stored in data input list 204 exists in active directory 150. At 304, in response to a determination that the active directory site, such as active directory site 126 or 128, does not exist, the method 300 continues with creating the active directory site in active directory 150.

The method 300 continues at 306 with determining whether a subnet, such as subnet 130, 132, 134, or 136, corresponding to a subnet name stored in data input list 204 exists in active directory 150. At 308, in response to a determination that the subnet, such as subnet 130, 132, 134, or 136 does not exist, the method 300 continues with creating the subnet in active directory 150.

Method 400 begins at 402 with accessing data input list 204. At 404, the method 400 continues with determining whether data input list 204 includes a site name that corresponds with an active directory site, such as active directory site 126 or 128. In one example, the site name may correspond with active directory site 126; however, in other examples, the site name may correspond with active directory site 128 or any other site in active directory 150 and method 400 would operate similarly. At 406, in response to a determination that data input list 204 does not include a site name corresponding with an active directory site, the method 400 stops. However, at 408, in response to a determination that data input list 204 does include a site name corresponding with active directory site 126, the method 400 continues with determining whether active directory site 126 exists in active directory 150.

In response to a determination that active directory site 126 does not exist in active directory 150, the method 400 continues at 410 with creating active directory site 126 in active directory 150. After creating active directory site 126 in active directory 150, the method 400 continues at 412 with updating active directory site 126's location and description in data input list 204.

In response to a determination that active directory site 126 does exist in active directory 150 or after updating active directory site 126's location and description in data input list 204, the method 400 continues at 414 with determining the subnet name associated with the site name corresponding to active directory site 126 in data input list 204. In one example, the subnet name associated with the site name in in data input list 204 may correspond with subnet 130; however, in other examples, the subnet name may correspond with subnet 132 or any other subnet in active directory site 126 and method 400 would operate similarly.

At 416, the method 400 continues with determining whether subnet 130 exists in active directory 150. In response to a determination that subnet 130 does not exist in active directory 150, the method 400 continues at 418 with creating subnet 130 in active directory 150. After creating subnet 130, the method 400 continues at 422 with associating subnet 130 with active directory site 126.

At 420, the method 400 continues with, in response to a determination that subnet 130 does exist in active directory 150, determining whether subnet 130 is linked to its associated active directory site, in this example, active directory site 126. At 422, in response to a determination that subnet 130 is not linked to active directory site 126, the method 400 continues with associating subnet 130 with active directory site 126.

At 424, in response to a determination that subnet 130 is associated with active directory site 126 or after associating subnet 130 with active directory site 126, the method 400 continues with proceeding to the next row or data collection point in data input list 204. The method 400 then repeats beginning at 404 with determining whether a site name exists in the next row of data input list 204.

Method 500 begins at 502 with accessing data input list 204. At 504, the method 500 continues with determining whether data input list 204, which in some examples is a spreadsheet, includes a site link name that corresponds with a site link, such as site link 138 or 140. In one example, the site link name may correspond with site link 138; however, in other examples, the site link name may correspond with site link 148 or any other site link in active directory 150 and method 500 would operate similarly. At 506, in response to a determination that a site name link does not exist in data input list 204, the method 500 stops. However, at 508, in response to a determination that data input list 204 does include a site link name corresponding with site link 138, the method 500 continues with determining whether site link 138 exists in active directory 150.

In response to a determination that site link 138 does not exist in active directory 150, the method 500 continues at 510 with creating site link 138 and at 512 with updating, in data input list 204, the site link description for site link 138.

At 514, the method 500 continues with determining whether the site link cost is listed for site link 138 in data input list 204. In response to a determination that the site link cost is not listed for site link 138 in data input list 204, the method 500 continues at 516 with updating the site link cost in active directory 150 to the default site link cost. In an example, the default site link cost is 100. In response to a determination that the site link cost is listed for site link 138 in data input list 204, the method 500 continues at 518 with updating the site link cost in active directory 150 for site link 138 to the site link cost listed in data input list 204.

At 520, the method 500 continues with determining whether a replication interval exists in the data input list 204. In response to a determination that the replication interval is not listed for active directory site 126 in data input list 204, the method 500 continues at 522 with updating the replication interval in active directory 150 to the default replication interval. In an example, the default replication interval equates to 100. In response to a determination that the replication interval is listed for active directory site 126 in data input list 204, the method 500 continues at 524 with updating the replication interval for active directory site 126 in active directory 150 to the replication interval listed in data input list 204.

In response to a determination at 508 that site link 138 does exist in active directory 150 or after updating the replication interval in active directory 150, the method 500 continues at 526 with determining which site name, for example the site name corresponding with active directory site 126, is associated with which site link names, for example site link 138, in data input list 204.

At block 528, the method 500 continues with determining whether active directory site 126 which corresponds to the site name in data input list 204 associated with the site link name in data input list 204 is associated with site link 138. In response to a determination that active directory site 126 is not associated with site link 138, the method 500 continues at 530 with associating active directory site 126 with site link 138. In response to active directory site 126 being associated with site link 138, at 532 the method 500 continues with proceeding to the next row or data collection point in data input list 204. The method 500 then repeats beginning at 504 with determining whether a site link name exists in the next row of data input list 204.

Figure 6:
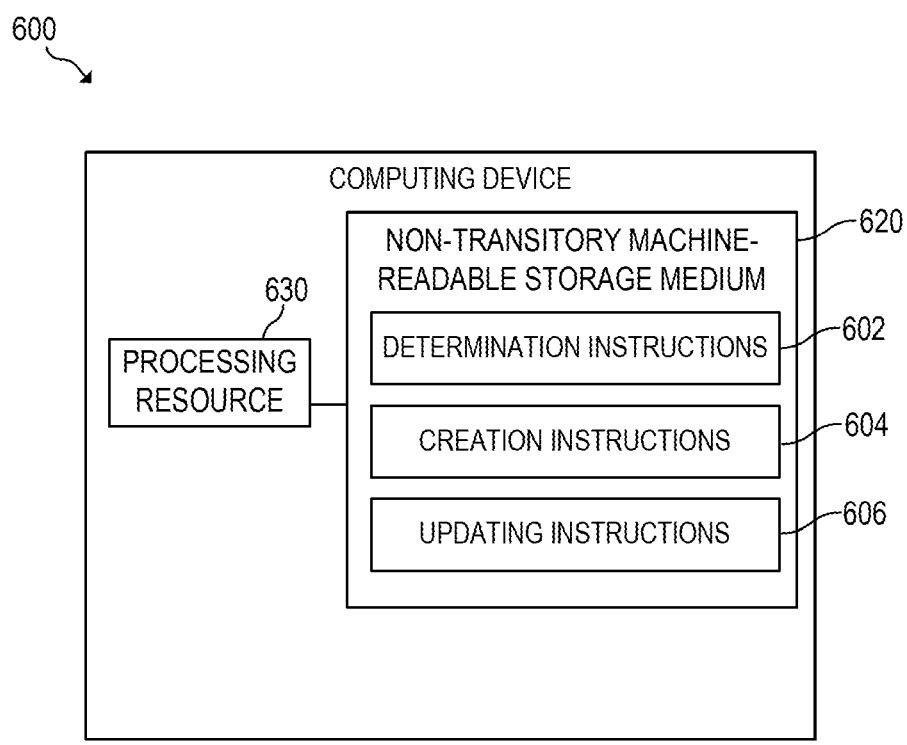
FIG. 6 is a block diagram of a computing device capable of creating an active directory topology, according to an example.

FIG. 6 is a block diagram of a computing device 600 to create an active directory topology, according to an example. The computing device 600 includes, for example, a processing resource 630 and a non-transitory machine-readable storage medium 620 including instructions 602, 604, and 606 for creating an active directory topology. Computing device 600 may be, for example, a notebook computer, a tablet computing device, a portable reading device, a wireless email device, a mobile phone, a workstation, a server, a desktop computer, or any other computing device.

Processing resource 630 may include a single processor, multiple processing resource, a single computer, a network of computers, or any other type of processing device suitable for retrieval and execution of instructions stored in machine-readable storage medium 620. For example, the processing resource 630 may include multiple cores on a chip, multiple cores across multiple chips, multiple cores across multiple devices (e.g., if the computing device 600 includes multiple node devices), or combinations thereof. Processing resource 630 may fetch, decode, and execute instructions 602-606 and instructions 708 from FIG. 7 to implement methods 300, 400, and 500. As an alternative or in addition to retrieving and executing instructions, processing resource 630 may include at least one integrated circuit (IC), other control logic, other electronic circuits, or combinations thereof that include a number of electronic components for performing the functionality of instructions 602-606 and 708.

The non-transitory machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As described in detail herein, machine-readable storage medium 620 may be encoded with a series of executable instructions for creating an active directory topology.

Determination instructions 602 may be used to determine whether a site link, such as site link 138, corresponding to a site link name stored in data input list 204 exists in active directory 150. Creation instructions 604 may be used to create, in response to a determination that site link 138 does not exist in active directory 150, site link 138 in active directory 150. Updating instructions 606 may be used to update, in response to a creation of site link 138, data input list 204 with a description of site link 138.

Updating instructions 606 also may be used to update in active directory 150, in response to the creation of site link 138, the site link cost for site link 138 and replication interval for site link 138 that is stored in data input list 204. Determination instructions 602 may also be used to determine whether active directory site 126 is associated with site link 138 in active directory 150.

Determination instructions 602 may also be used to determine whether an active directory site corresponding to a site name stored in data input list 204, such as active directory site 126, exists in active directory 150. Creation instructions 604 may then be used to create, in response to a determination that active directory site 126 does not exist in active directory 150, active directory site 126 in active directory 150. Determination instructions 602 may also be used to determine whether a subnet corresponding to a subnet name stored in data input list 204, such as subnet 130, exists in active directory 150. Creation instructions 604 may then be used to create, in response to a determination that subnet 130 does not exist in active directory 150, subnet 130 in active directory 150.

Updating instructions 606 may also be used to update in data input list 204 with the location and description of active directory site 126. Determination instructions 602 may be used to determine whether subnet 130 is linked to active directory site 126 in active directory 150.

Figure 7:
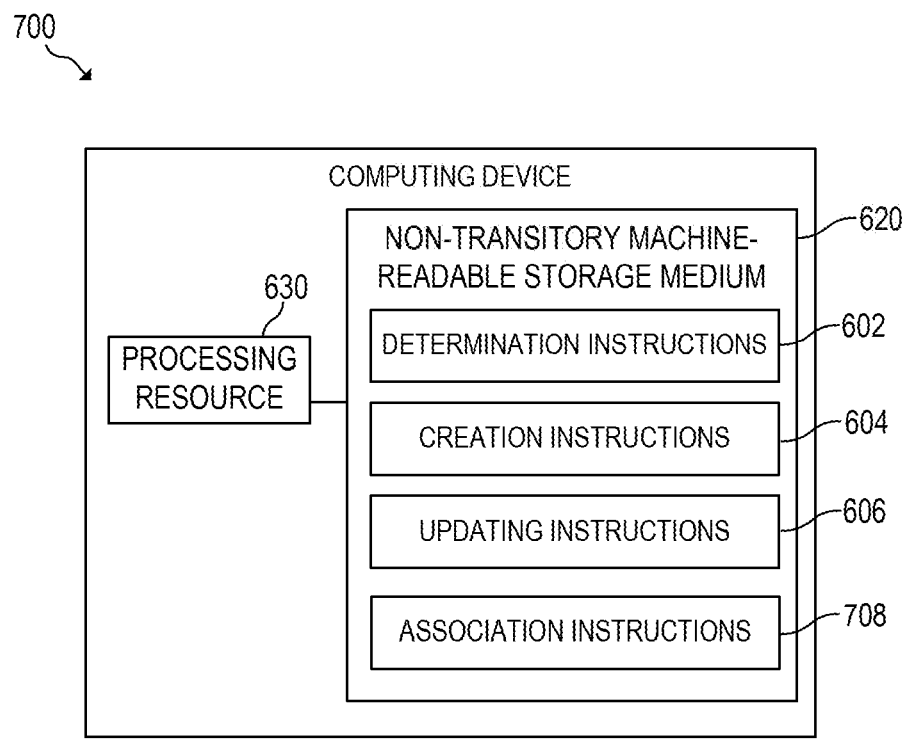
FIG. 7 is a block diagram of a computing device 700 to create an active directory topology, according to an example.

FIG. 7 is a block diagram of a computing device 700 to create an active directory topology, according to an example. Computing device 700 may be, for example, a notebook computer, a tablet computing device, a portable reading device, a wireless email device, a mobile phone, a workstation, a server, a desktop computer, or any other computing device. Computing device 700 from FIG. 7 includes the same processing resource 630 and non-transitory machine readable storage medium 620 including instructions 602, 604, and 606 as computing device 600 from FIG. 6 and that discussion will not be repeated for creating an active directory topology. Computing device 700, in addition includes instruction 708 in non-transitory machine readable storage medium 620.

In response to a determination that active directory site 126 is not associated with site link 138 in active directory 150, association instructions 708 may be used to associate active directory site 126 with site link 138 in active directory 150. Additionally, association instructions 708 may be used to associate, in response to a determination that subnet 130 is not linked to active directory site 126 in active directory 150, subnet 130 with active directory site 126 in active directory 150.

The above discussion is meant to be illustrative of the principles of the various examples disclosed herein. Numerous variations and modifications will become apparent to those skilled in the art once the above disclosure is fully appreciated. It is intended that the following claims be interpreted to embrace all such variations and modifications.

What is claimed is:

1. An active directory topology creation device, comprising:
    a storage module to store a data input list,
        wherein the data input list comprises an active directory site name, a site link name, and a subnet name associated with the active directory site name, and
        wherein the data input list further comprises a site link cost and a replication interval, the site link cost and replication interval being associated with the site link name; and
    a processing resource coupled to the storage module, the processing resource to:
        access the data input list;
        determine whether an active directory site corresponding to the active directory site name exists;
        create, in response to a determination that the active directory site does not exist, the active directory site;
        determine whether a subnet corresponding to the subnet name exists;
        create, in response to a determination that the subnet does not exist, the subnet;
        associate, in response to a determination that the subnet is not linked to its associated active directory site, the subnet with its associated active directory site; and
        update, in response to a creation of a site link, the site link cost and replication interval listed in the data input list.

2. The active directory topology creation device of claim 1, wherein the processing resource is further to:
    determine whether the subnet is linked to its associated active directory site.

3. The active directory topology creation device of claim 1, wherein the processing resource is further to update the data input list a location and a description of the active directory site.

4. The active directory topology creation device of claim 1,
    wherein the processing resource is further to:
        determine whether the site link corresponding to the site link name exists; and
        create, in response to a determination that the site link does not exist, the site link; and
        update, in response to a creation of the site link, the data input list with a description of the site link.

5. The active directory topology creation device of claim 4,
    wherein the site link name is associated with the active directory site name; and
    wherein the processing resource is further to:
        determine whether the active directory site is associated with the site link; and
        associate, in response to a determination that the active directory site is not associated with the site link, the active directory site with the site link.

6. A non-transitory machine-readable storage medium storing instructions that, if executed by a processing resource of an active directory topology creation device, cause the processing resource to:
    determine whether a site link corresponding to a site link name stored in a data input list exists;
    create, in response to a determination that the site link does not exist, the site link;
    update, in response to a creation of the site link, the data input list with a description of the site link; and
    update, in response to the creation of the site link, a site link cost and replication interval in an active directory, the site link cost and replication interval being stored in the data input list and associated with the site link name.

7. The non-transitory machine-readable storage medium of claim 6, further comprising instructions that, if executed by the processing resource, cause the processing resource to:
    determine whether an active directory site is associated with the site link; and
    associate, in response to a determination that the active directory site is not associated with the site link, the active directory site with the site link.

8. The non-transitory machine-readable storage medium of claim 6, further comprising instructions that, if executed by the processing resource, cause the processing resource to:
    determine whether an active directory site corresponding to an active directory site name stored in the data input list exists;
    create, in response to a determination that the active directory site does not exist, the active directory site;
    determine whether a subnet corresponding to a subnet name stored in the data input list exists; and create, in response to a determination that the subnet does not exist, the subnet.

9. The non-transitory machine-readable storage medium of claim 8, further comprising instructions that, if executed by the processing resource, cause the processing resource to:
update the data input list with a location and description of the active directory site;
determine whether the subnet is linked to its associated active directory site; and
associate, in response to a determination that the subnet is not linked to its associated active directory site, the subnet with its associated active directory site.

10. The non-transitory machine-readable storage medium of claim 6, wherein the data input list is a spreadsheet.

11. A method for creating an active directory topology, comprising:
determining, by a processing resource, that an active directory site corresponds to an active directory site name stored in a spreadsheet exists;
creating, in response to a determination that the active directory site does not exist, the active directory site;
determining that a subnet corresponds to a subnet name stored in the spreadsheet exists;
creating, in response to a determination that the subnet does not exist, the subnet;
associate, in response to a determination that the subnet is not linked to its associated active directory site, the subnet with its associated active directory site;
determining that a site link corresponds to a site link name stored in the spreadsheet exists;
creating, in response to a determination that the site link does not exist, the site link; and
updating, in response to a creation of the site link, an active directory with a site link cost and replication interval stored in the spreadsheet.

12. The method for creating an active directory topology of claim 11, further comprising:
updating the spreadsheet with a location and description of the active directory site;
determining that the subnet is linked to its associated active directory site; and
associating, in response to a determination that the subnet is not linked to its associated active directory site, the subnet with its associated active directory site.

13. The method for creating an active directory topology of claim 11, further comprising:
determining that the active directory site is associated with the site link; and
associating, in response to a determination that the active directory site is not associated with the site link, the active directory site with the site link.

* * * * *